United States Patent
Berkey et al.

(10) Patent No.: US 6,904,772 B2
(45) Date of Patent: Jun. 14, 2005

(54) METHOD OF MAKING A GLASS PREFORM FOR LOW WATER PEAK OPTICAL FIBER

(75) Inventors: George E. Berkey, Pine City, NY (US); Dana C. Bookbinder, Corning, NY (US); Richard M. Fiacco, Corning, NY (US); Dale R. Powers, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/023,291

(22) Filed: Dec. 14, 2001

(65) Prior Publication Data

US 2002/0102083 A1 Aug. 1, 2002

Related U.S. Application Data

(60) Provisional application No. 60/258,179, filed on Dec. 22, 2000, and provisional application No. 60/272,015, filed on Feb. 28, 2001.

(51) Int. Cl.$^7$ ............................................. C03B 37/027
(52) U.S. Cl. ............................. 65/412; 65/422; 65/424; 65/426
(58) Field of Search .......................... 65/412, 422, 424, 65/426

(56) References Cited

U.S. PATENT DOCUMENTS 3,933,454 A   1/1976   DeLuca .......................... 65/3
4,345,928 A   8/1982   Kawachi et al. ............. 65/18.2
4,462,970 A   7/1984   Pastor et al. ................. 423/263

(Continued)

FOREIGN PATENT DOCUMENTS

| EP | 0164681 B1 | 6/1985 | ............ G02B/6/16 |
| EP | 0321182 A2 | 12/1988 | ......... C03B/37/025 |
| EP | 0656326 B1 | 11/1994 | ......... C03B/37/018 |

(Continued)

OTHER PUBLICATIONS

Shang et al "Low –OH MCVD Fibres without a Barrier Layer using OH–OD–Exchanged Substrate Tubes", Electronic Letters, 3$^{rd}$ Feb. 1983 vol. 19 No. 3. pp. 95–96.*
English Abstract of JP 09197148 , Jul. 31, 1997.*

(Continued)

*Primary Examiner*—John Hoffmann
(74) *Attorney, Agent, or Firm*—Joseph M. Homa

(57) ABSTRACT

Optical waveguide fiber having low water peak as well as optical waveguide fiber preforms and methods of making optical waveguide fiber preforms from which low water peak and/or low hydrogen aged attenuation optical waveguide fibers are formed, including optical waveguide fiber and preforms made via OVD. The fibers may be hydrogen resistant, i.e. exhibit low hydrogen aged attenuation. A low water peak, hydrogen resistant optical waveguide fiber is disclosed which exhibits an optical attenuation at a wavelength of about 1383 nm which is less than or equal to an optical attenuation exhibited at a wavelength of about 1310 nm.

21 Claims, 5 Drawing Sheets

U.S. PATENT DOCUMENTS

| | | | |
|---|---|---|---|
| 4,462,974 A | 7/1984 | Pastor et al. | 423/335 |
| 4,465,656 A | 8/1984 | Pastor et al. | 423/339 |
| 4,515,612 A * | 5/1985 | Burrus et al. | 65/426 |
| 4,526,599 A | 7/1985 | Barns et al. | 65/3.12 |
| 4,675,040 A | 6/1987 | Tanaka et al. | 65/3.12 |
| 4,684,383 A | 8/1987 | Cavender, Jr. et al. | 65/3.12 |
| 4,685,945 A * | 8/1987 | Freund | 65/426 |
| 4,822,136 A | 4/1989 | Hicks, Jr. | 350/96.34 |
| 4,842,626 A | 6/1989 | Barns et al. | 65/2 |
| 5,318,611 A | 6/1994 | Merritt | 65/3.12 |
| 5,397,372 A | 3/1995 | Partus et al. | 65/391 |
| 5,692,087 A | 11/1997 | Partus et al. | 385/123 |
| 5,917,109 A * | 6/1999 | Berkey | 65/412 |
| 6,131,415 A | 10/2000 | Chang et al. | 65/391 |
| 6,205,268 B1 | 3/2001 | Chraplyvy et al. | 385/24 |
| 6,266,980 B1 | 7/2001 | Lemon et al. | 65/414 |
| 6,477,305 B1 * | 11/2002 | Berkey et al. | 385/123 |
| 2002/0028051 A1 | 3/2002 | Bickham et al. | 385/123 |
| 2002/0051612 A1 | 5/2002 | Shimizu et al. | 385/123 |

FOREIGN PATENT DOCUMENTS

| | | | | |
|---|---|---|---|---|
| EP | 0785448 A | 7/1997 | | G02B/6/16 |
| EP | 0887670 A2 | 6/1998 | | G02B/6/16 |
| EP | 1030473 A3 | 2/2000 | | H04B/10/18 |
| EP | 1182176 A1 | 8/2000 | | C03C/25/00 |
| EP | 1215179 A2 | 10/2001 | | C03B/37/014 |
| GB | 2 149 392 A | 11/1983 | | C03C/23/00 |
| JP | 55-23081 | 2/1980 | | C03B/37/00 |
| JP | 57-17433 | 1/1982 | | C03B/37/00 |
| JP | 57-34034 | 2/1982 | | C03B/37/00 |
| JP | 60-71536 | 4/1985 | | C03B/37/018 |
| JP | 60-86043 | 5/1985 | | C03B/37/018 |
| JP | 63-225546 | 9/1988 | | C03B/37/018 |
| JP | 1-242432 | 9/1989 | | C03B/37/018 |
| JP | 10-68834 | 3/1998 | | G02B/6/16 |
| WO | WO00/64824 | 11/2000 | | C03B/37/00 |
| WO | WO00/64825 | 11/2000 | | C05B/37/014 |

OTHER PUBLICATIONS

Belov et al, "OH Absorption in $GeO_2$–Doped Fused Silica Fibres", Electronics Letters, Sep. 16, 1982, vol. 18, No. 19, pp. 836–837.

Birks et al, "Elimination of Water Peak in Optical Fibre Taper Components", Electronics Letters, Oct. 11, 1990, vol. 26, No. 21, pp. 1761–1762.

U.S. patent application Ser. No. 09/547,598, Berkey et al., filed Apr. 11, 2000.

Chang et al, "New Hydrogen Aging Loss Mechanism in the 1400 nm Window", Optical Fiber Communication Conference, 1999, Bell Laboratories, Lucent Technologies, Norcross, GA, pp. PD22–1–PD22–3.

Chida et al, "Fabrication of OH–Free Multimode Fiber by Vapor Phase Axial Deposition", IEEE Journal of Quantum Electronics, Nov. 1982, vol. QE–18, No. 11, pp. 1883–1889.

Chida et al, "VAD Graded–Index Optical Fiber Fabrication", Review of the Electrical Communication Laboratories, (1984), vol. 32, No. 3, pp. 404–410.

U.S. patent application Ser. No. 09/558,770, Allen et al., filed Apr. 26, 2000.

U.S. patent application Ser. No. 09/722,804, Bookbinder et al., filed Nov. 27, 2000.

U.S. patent application Ser. No. 09/822,168, Berkey et al., filed Mar. 31, 2001.

U.S. patent application Ser. No. 09/996,632, Berkey et al., filed Nov. 28, 2001.

U.S. patent application Ser. No. 10/023,291, Berkey et al., filed Dec. 14, 2001.

U.S. patent application Ser. No. 60/309,160, Berkey et al., filed Jul. 31, 2002.

Dianov et al, "Low–Hydrogen Silicon Oxynitride Optical Fibers Prepared by SPCVD", Journal of Lightwave Technology, Jul. 1995, vol. 13, No. 7, pp. 1471–1474.

Diaz de la Iglesia et al, "Loss Spread in Single–Mode Fibers Due to OH–Ion Concentration and Transmiter–Wavelength Eluctuations", International Wire & Cable Symposium Proceedings 1987, pp. 629–639.

Hanawa et al, "Fabrication of Completely OH–Free V.A.D. Fibre", Electronics Letters, Aug. 28, 1980, vol. 16, No. 18, pp. 699–700.

Iino et al, "Mechanisms of Hydrogen–Induced Losses in Silica–Based Optical Fibers", Journal Of Lightwave Technology, Nov. 1990, vol. 8, No. 11, pp. 1675–1679.

Jablonowski, "Fiber Manufacture at AT&T with the MCVD Process", Journal of Lightwave Technology, Aug. 1986, vol. LT–4, No. 8, pp. 1016–1019.

Keck et al, "On the ultimate lower limit of attenuation in glass optical waveguides", Applied Phys. Letters, Apr. 1973, vol. 22, No. 7, pp. 307–309.

Kosaka et al, "Fabrication of ultra low–loss and low–OH VAD single mode fibers", Optical Communication, ECOC '84, $10^{th}$ European Conference on Optical Communication, Sep. 3–6, 1984, Stuttgart, FRG.

Kosaka et al, "(1144) A Low Loss, Low OH Content, Single–Mode Fiber", The 1984 National Convention of the Electronic Telecommunications Society (Japanese with English language translation).

Moriyama et al, "Ultimately Low OH Content V.A.D. Optical Fibres", Electronic Letters, Aug. 28, 1980, vol. 16, No. 18, pp. 698–699.

Murata, "Recent Developments in Vapor Phase Axial Deposition", Journal of Lightwave Technology, Aug. 1986, vol. LT–4, No. 8, pp. 1026–1033.

Bachmann et al, "Low OH Excess Loss PCVD Fibres Prepared by Fluorine Doping", Electronics Letters, Jan. 5, 1984, vol. 20, No. 1, pp. 35–37.

Nakahara et al, "Loss Increase in Deuterium–Doped VAD Fibres with Heat Treatment", Electronics Letters, Apr. 12, 1984, vol. 20, No. 8, pp. 327–329.

Osanai et al, "Effect of Dopants on Transmission Loss of Low–OH–Content Optical Fibres", Electronics Letters, Oct. 14, 1976, vol. 12, No. 21, pp. 549–550.

Peder–Gothoni et al, "Reduction of Hydroxyl Ion Diffusion in Optical Fibers", Optics Communications, Jun. 1, 1985, vol. 54, No. 3, pp. 137–140.

Stone et al, "Overtone vibrations of OH groups in fused silica optical fibers", J. Chem. Phys. 76(4), Feb. 15, 1982,, pp. 1712–1722.

Stone, "Interactions of Hydrogen and Deuterium with Silica Optical Fibers: A Review", Journal of Lightwave Technology, May 1987, vol. LT–5, No. 5, pp. 712–733.

Stone et al, "Reduction of the 1.38–$\mu$m Water Peak in Optical Fibers by Deuterium–Hydrogen Exchange", AT&T, The Bell System Technical Journal, Oct. 1980, vol. 59, No. 8.

Tsujikawa et al, "Reduction of OH absorption loss by deuteration in $Na_2O$–$Al_2O_3SiO_2$ glass fibre", Electronics Letters, Oct. 15, 1998, vol. 34, No. 21.

MicroPatent Report of Abstract of JP01242432, Mar. 23, 1988, Furukawa Electric Co. Ltd (Corresponds to item BJ herein).

MicroPatent Report of Abstract of JP10068834, Aug. 28, 1996, Sumitomo Electric (Corresponds to item BT herein).

MicroPatent Report of Abstract of JP55023081, Aug. 8, 1978, Sumitomo Electric (Corresponds to item BU herein).

MicroPatent Report of Abstract of JP57017433, May 24, 1980, Nippon Telegraph & Telephone Corp (Corresponds to item BV herein).

MicroPatent Report of Abstract of JP57034034, Aug. 5, 1980, Nippon Telegraph & Telephone Corp. (Corresponds to item BW herein).

MicroPatent Report of Abstract of JP60071536, Aug. 10, 1984, Nippon Telegraph & Telephone Corp. (Corresponds to item BX herein).

MicroPatent Report of Abstract of JP60086043, Oct. 14, 1983, Nippon Telegraph & Telephone Corp. (Corresponds to item BY herein).

Kumar et al, "Effects of Deuterium Treatments on the Optical Properties of Fused Silica", *Laser Induced Damage in Optical Materials*: 1981, pp. 268–272.

* cited by examiner

METHOD OF MAKING A GLASS PREFORM FOR LOW WATER PEAK OPTICAL FIBER

RELATED APPLICATIONS

This application claims the benefit of the priority date of U.S. Provisional Patent Application No. 60/258,179, filed on Dec. 22, 2000, entitled "Hydrogen Resistant Low Water Peak Optical Waveguide Fiber and Method of Manufacturing Same", and U.S. Provisional Patent Application No. 60/272,015, filed Feb. 28, 2001, entitled "Low Water Peak Optical Waveguide Fiber".

BACKGROUND OF THE INVENTION

1. Field of the Invention

The present invention relates generally to the field of optical waveguide fibers, and more particularly to optical waveguide fibers having low water peak.

2. Technical Background

Generally speaking, a significant goal of the telecommunications industry is to transmit greater amounts of information, over longer distances, in shorter periods of time.

Typically, as the number of systems users and frequency of system use increase, demand for system resources increases as well. One way of meeting this demand is by increasing the bandwidth of the medium used to carry this information over long distances. In optical telecommunications systems, the demand for optical waveguide fibers having increased bandwidth is particularly high.

In recent years, significant advancements have been made in the manufacture of optical waveguide fiber, which in turn have increased the usable light carrying capacity of the fiber. However, as is well known, electromagnetic radiation traveling through an optical waveguide fiber is subject to attenuation or loss due to several mechanisms. Although some of these mechanisms can not be reduced, others have been eliminated, or at least substantially reduced.

A particularly problematic component of optical fiber attenuation is the attenuation due to absorption by the optical waveguide fiber of impurities present in the light guiding region of the fiber. Particularly troublesome is the attenuation caused by the hydroxyl radical (OH), which can be formed in the optical waveguide fiber when a source of hydrogen is present in the fiber material, or when hydrogen available from several sources during the fiber manufacturing process diffuses into the glass. Silica bodies of the type used in optical fiber and optical fiber preform manufacture can contain a substantial amount of OH. Generally speaking, the hydrogen bonds with the oxygen available in the $SiO_2$ and/or $GeO_2$ and/or other oxygen containing compound in the glass matrix to form the OH and/or $OH_2$ bonds referred to generally as "water". The attenuation increase due to OH or water in the glass can be as high as about 0.5 to 1.0 dB/km, with the attenuation peak generally occupying the 1380 nm window. As used herein, the phrase, "1380 nm window" is defined as the range of wavelengths between about 1330 nm to about 1470 nm. The attenuation peak, generally referred to as the water peak has prevented usable electromagnetic transmission in the 1380 nm window.

Until recently, telecommunications systems avoided the water peak residing in the 1380 nm window by operating in the 1310 nm window and/or the 1550 nm window, among others. With the advent of wavelength division multiplexing ("WDM") and advancements in amplifier technology, which enable telecommunications systems to operate over broad wavelength ranges, it is now likely that all wavelengths between about 1300 nm and about 1650 nm will be used for data transfer in optical telecommunications systems. Removing the water peak from optical waveguide fiber used with such systems is an important aspect of enabling system operation over this entire range.

Communications systems operating at bit rates above about a gigahertz or which include wavelength division multiplexing are facilitated through use of high performance waveguides. In such high performance systems launched power can range from 0.1 mW to 10 mW and higher. In the higher power systems, the desired properties of the waveguide fiber include larger effective area. New system strategies are being sought to decrease cost even while system performance is being enhanced.

A promising strategy is one that involves matching system components in such a way that a particular property of one component compensates a drawback in another component. Preferably, the component matching strategy is one in which a given component is designed to allow another component to operate more efficiently or effectively. Such compensation schemes have been effective, for example, in reducing dispersion penalty by adding a dispersion compensating module to within a communications link, thereby providing for a desired signal to noise ratio or signal pulse shape after the signal pulse has traversed the optical waveguide fiber of the link. Another example of effective compensation is the use of large effective area waveguide fiber in communications systems in which non-linear effects are a major source of signal degradation.

One area which can provide an increase in performance and a decrease in cost is that of matching a signal source to a fiber. A cost effective signal source, having relatively high power output and good longevity is the distributed feedback laser (DFB) which is directly modulated. However a directly modulated DFB laser is always positively chirped. That is, the leading edge of the pulse is shifted to longer wavelengths (red shifted) and the trailing edge is blue shifted. When such a pulse propagates in a positive dispersion fiber, the positive chirp results in pulse broadening. Efforts have been made to reduce the effect of positive chirp by biasing the semiconductor laser above threshold. See *Fiber Optic Communications Systems*, G. P. Agrawal, p. 223.

DEFINITIONS

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion of a waveguide fiber is the sum of the material dispersion, the waveguide dispersion, and the inter-modal dispersion. In the case of single mode waveguide fibers the inter-mode dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

A chirped laser is one that produces an output pulse wherein the wavelengths within the pulse wavelength are shifted backward or forward in time. That is, the output pulse is red or blue shifted. A laser having a positive chirp is one in which the leading edge of the output pulse is red shifted and the trailing edge blue shifted.

The effective area is $$A_{eff}=2\pi(\int E^2 rdr)^2/(\int E^4 .rdr)$$

where the integration limits are 0 to ∞, and E is the electric field associated with light propagated in the waveguide. An effective diameter, $D_{eff}$, may be defined as, $$A_{eff}=\pi(D_{eff}/2)^2,$$

The relative refractive index percent, $$\Delta\%=100\times(n_i^2-n_c^2)/2n_i^2,$$

where $n_i$ is the maximum refractive index in region i, unless otherwise specified, and $n_c$ is the average refractive index of the cladding region.

The term α-profile refers to a refractive index profile, expressed in terms of Δ(b) %, where b is radius, which follows the equation, $$\Delta(b)\%=\Delta(b_o)(1-[|b-b_o|/(b_1-b_o)]^\alpha)$$

where $b_o$ is the point at which Δ(b) % is maximum, $b_1$ is the point at which Δ(b) % is zero, and b is in the range $b_i \leq b \leq b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α-profile and the step or other profile.

In the model, in order to bring about a smooth joining of the α-profile with the profile of the adjacent profile segment, the equation is rewritten as;

$$\Delta(b)\%=\Delta(b_a)+[\Delta(b_o)-\Delta(b_a)]\{(1-[|b-b_o|/(b_1-b_o)]^\alpha\},$$

where $b_a$ is the first point of an adjacent segment.

The pin array bend test is used to compare relative resistance of waveguide fibers to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins.

Another bend test referenced herein is the lateral load test. In this test a prescribed length of waveguide fiber is placed between two flat plates. A #70 wire mesh is attached to one of the plates. (The market code #70 mesh is descriptive of screen made of wire having a diameter of 0.178 mm. The screen openings are squares of side length 0.185 mm.) A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

Adiabatic chirp is proportional to the output power of the signal.

Transient chirp is proportional to the derivative of the output power of the signal and so is present only in the time periods when the signal power is in transition between a 0 and a 1 (or a 1 to a 0).

Gain compression factor, also known as the nonlinear gain parameter, refers to a semiconductor laser and is a proportionality constant that relates semiconductor laser material optical gain of the active region of the laser to the number of photons in the active region. In the relationship, G=f(εP), G is the gain of the laser, ε is the gain compression factor, P is number of photons in the active region (which is directly related to the laser output power) and f is a function. See *Fiber Optic Communications Systems 2$^{nd}$ Edition*, Agrawal, page 113.

SUMMARY OF THE INVENTION

In one aspect, the present invention relates to a low water peak optical waveguide fiber which is preferably hydrogen resistant.

In another aspect, the present invention relates to a method of making a low water peak, hydrogen resistant optical waveguide fiber.

A further aspect of the present invention is directed to a preform which is capable of serving as a precursor to a low water peak, hydrogen resistant optical waveguide fiber.

In another aspect, the present invention relates to a method of fabricating a preform for use in manufacturing optical waveguide fiber, the method comprising the steps of depositing soot onto a substrate to form a soot glass body thereon, removing the substrate from the soot body, thereby forming a centerline hole extending axially therethrough, plugging at least one end of the centerline hole using at least one other glass body, drying the soot body, and consolidating the soot body to form a glass preform, wherein the at least one other glass body is pre-deuterated.

In a preferred embodiment, a portion of the soot body sinters around and engages the at least one other glass body during the consolidating step.

Preferably, the consolidating step further comprises forming a glass preform having a sealed centerline hole. In a preferred embodiment, the plugging step further comprises plugging both ends of the centerline hole of the soot body using glass plugs, wherein at least one of the plugs is made of pre-deuterated glass.

In a preferred embodiment, the plugging step further comprises inserting plugs into each end of the centerline hole of the soot body, wherein at least one of the plugs is made of pre-deuterated glass, and wherein the consolidating step further comprises forming a glass preform having a sealed centerline hole.

In another preferred embodiment, the method further comprises inserting first and second glass plugs into respective ends of the centerline hole of the soot body, then consolidating the soot body to form a glass preform, wherein a portion of the soot body sinters around and engages the first and second glass plugs, thereby sealing the centerline hole, wherein at least one of the glass plugs is deuterated.

In some preferred embodiments, the method further comprises deuterating the at least one of the glass bodies before the depositing step.

In other preferred embodiments, the method further comprises deuterating the at least one of the glass bodies before the inserting step.

In a preferred embodiment, the depositing step further comprises depositing soot onto a pre-deuterated glass handle.

In a preferred embodiment, the depositing step further comprises depositing soot onto a glass handle, and the plugging step further comprises plugging both ends of the centerline hole of the soot body using glass plugs, wherein at least one of the plugs and the handle is pre-deuterated.

In another preferred embodiment, the depositing step further comprises depositing soot onto a pre-deuterated glass handle, and the plugging step further comprises plugging both ends of the centerline hole of the soot body using pre-deuterated glass plugs.

In a preferred embodiment, the method further includes overcladding the glass preform.

In some preferred embodiments, the overcladding includes depositing soot onto the glass preform, and preferably further includes drying and consolidating the soot deposited on the glass preform.

In some embodiments, the overcladding step further comprises disposing a tube over the glass preform.

In preferred embodiments, the method may further comprise drawing the glass preform into optical fiber and deuterating the optical fiber.

In another aspect, the present invention relates to an optical waveguide fiber comprising: a core region having a centerline and at least two segments having a positive relative refractive index, a refractive index profile, and an inner and an outer radius, the radii being measured with reference to the centerline; and a clad layer surrounding and in contact with the core region, the clad layer having a relative index and a refractive index profile; wherein the optical waveguide fiber exhibits an optical attenuation at a wavelength of about 1383 nm which is not more than 0.10 dB/km above an optical attenuation exhibited at a wavelength of about 1310 nm. Preferably, the fiber is made by an OVD process. In a preferred embodiment, at least part of the fiber is made by an OVD process.

More preferably, the optical waveguide fiber exhibits an optical attenuation at a wavelength of about 1383 nm which is not more than 0.07 dB/km above an optical attenuation exhibited at a wavelength of about 1310 nm. Even more preferably, the optical waveguide fiber exhibits an optical attenuation at a wavelength of about 1383 nm which is not more than 0.04 dB/km above an optical attenuation exhibited at a wavelength of about 1310 nm. Still more preferably, the optical waveguide fiber exhibits an optical attenuation at a wavelength of about 1383 nm which is not more than 0.02 dB/km above an optical attenuation exhibited at a wavelength of about 1310 nm. Yet still more preferably, the optical waveguide fiber exhibits an optical attenuation at a wavelength of about 1383 nm which is less than or equal to an optical attenuation exhibited at a wavelength of about 1310 nm. Even more preferably, the optical waveguide fiber exhibits an optical attenuation at a wavelength of about 1383 nm which is at least 0.02 dB/km below an optical attenuation exhibited at a wavelength of about 1310 nm. Even still more preferably, the optical waveguide fiber exhibits an optical attenuation at a wavelength of about 1383 nm which is at least 0.04 dB/km below an optical attenuation exhibited at a wavelength of about 1310 nm. Even yet more preferably, the optical waveguide fiber exhibits an optical attenuation at a wavelength of about 1383 nm which is at least 0.06 dB/km below an optical attenuation exhibited at a wavelength of about 1310 nm.

Preferably, the optical waveguide fiber exhibits a maximum hydrogen induced attenuation change of less than about 0.03 dB/km at a wavelength of 1383 nm after being subjected to a 0.01 atm hydrogen partial pressure for at least 144 hours.

Preferably, the optical attenuation exhibited by the optical waveguide fiber at a wavelength of about 1383 nm is less than or equal to about 0.45 dB/km, more preferably less than or equal to about 0.40 dB/km, even more preferably less than or equal to about 0.35 dB/km, and still more preferably less than or equal to about 0.31 dB/km.

In another aspect, the present invention relates to an optical waveguide fiber comprising a silica containing glass core and a glass cladding surrounding the silica containing glass core, wherein the optical waveguide fiber exhibits an optical attenuation at a wavelength of about 1383 nm which is not more than 0.10 dB/km above an optical attenuation exhibited at a wavelength of about 1310 nm, and wherein the optical waveguide fiber exhibits a zero dispersion at a wavelength greater than 1310 nm.

Preferably, the optical waveguide fiber exhibits an optical attenuation at a wavelength of about 1383 nm which is less than or equal to an optical attenuation exhibited at a wavelength of about 1310 nm.

In a preferred embodiment, the fiber is not a step-index fiber.

In another preferred embodiment, the fiber is not a graded-index fiber.

In a preferred embodiment, the optical waveguide fiber exhibits a positive dispersion at wavelengths above the zero dispersion wavelength.

In another preferred embodiment, the optical waveguide fiber exhibits a negative dispersion at wavelengths above the zero dispersion wavelength.

In a preferred embodiment, the optical waveguide fiber exhibits a zero dispersion at a wavelength between 1310 nm and 1670 nm. In another preferred embodiment, the optical waveguide fiber exhibits a zero dispersion at a wavelength greater than about 1320 nm. In yet another preferred embodiment, the optical waveguide fiber exhibits a zero dispersion at a wavelength greater than about 1340 nm. In still another preferred embodiment, the optical waveguide fiber exhibits a zero dispersion at a wavelength greater than about 1380 nm. In yet another preferred embodiment, the optical waveguide fiber exhibits a zero dispersion at a wavelength greater than about 1410 nm. In another preferred embodiment, the optical waveguide fiber exhibits a zero dispersion at a wavelength greater than about 1500 nm. In still another preferred embodiment, the optical waveguide fiber exhibits a zero dispersion at a wavelength greater than about 1580 nm. In yet another preferred embodiment, the optical waveguide fiber exhibits a zero dispersion at a wavelength greater than about 1650 nm. In still another preferred embodiment, the optical waveguide fiber exhibits a zero dispersion at a wavelength greater than about 1670 nm.

Preferably, the optical waveguide fiber exhibits a maximum hydrogen induced attenuation change of less than about 0.03 dB/km at a wavelength of 1383 nm after being subjected to a 0.01 atm hydrogen partial pressure for at least 144 hours.

Preferably, at least part of the fiber is made by an OVD process.

More preferably, the optical waveguide fiber exhibits a maximum hydrogen induced attenuation change of less than about 0.03 dB/km at a wavelength of about 1383 nm after being subjected to a 0.01 atm hydrogen partial pressure for at least 336 hours.

Even more preferably, the optical waveguide fiber exhibits a maximum hydrogen induced attenuation change of less than about 0.02 dB/km at each wavelength within a wavelength range from about 1300 nm to about 1600 nm after being subjected to a 0.01 atm hydrogen partial pressure for at least 144 hours.

Preferably, the optical waveguide fiber exhibits a maximum hydrogen induced attenuation change of less than about 0.005 dB/km at each wavelength within a wavelength range from about 1300 nm to about 1600 nm after being subjected to a 0.01 atm hydrogen partial pressure for at least 336 hours.

In preferred embodiments, the core is doped with germania. Preferably, the cladding glass comprises silica. Preferably, the fiber contains no fluorine-based dopant. Preferably, the glass core contains no fluorine-based dopant. Preferably, the glass cladding contains no fluorine-based dopant.

In another aspect, the present invention relates to a waveguide fiber communications link, preferably having no regenerators and having a bit rate and a length, the link comprising: a laser source to provide light signals that have a pre-selected wavelength; a receiver to receive light at the pre-selected wavelength; and, at least one length of waveguide fiber having a first and a second end, the first end optically coupled to the laser source to receive the laser light, and the second end optically coupled to the receiver. Preferably, the laser source is chirped, the chirp being either positive or negative, and, the total dispersion of the at least one length of waveguide fiber at about 1380 nm has total dispersion opposite in sign to the laser chirp. In a preferred embodiment, the laser is positively chirped and the total dispersion of a portion of the at least one length of waveguide fiber is negative.

One aspect of the present invention relates to a low water peak, hydrogen resistant optical waveguide fiber which preferably exhibits an optical attenuation at a wavelength of about 1383 nm which is less than or equal to an optical attenuation exhibited at a wavelength of about 1310 nm, and which exhibits a maximum hydrogen induced attenuation change of less than about 0.03 dB/km at a wavelength of 1383 nm after being subjected to a 0.01 atm hydrogen partial pressure for at least 144 hours, and more preferably for at least 336 hours.

In one preferred embodiment, the optical waveguide fiber exhibits an optical attenuation of less than about 0.31 dB/km at a wavelength of 1383 nm and exhibits a maximum hydrogen induced attenuation change of less than about 0.03 dB/km at a wavelength of 1383 nm after being subjected to a 0.01 atm hydrogen partial pressure for at least 144 hours, even more preferably for at least 336 hours.

In another aspect, the present invention relates to a method of making a low water peak, hydrogen resistant optical waveguide fiber.

A further aspect of the present invention is directed to a preform which is capable of serving as a precursor to a low water peak, hydrogen resistant optical waveguide fiber.

In another aspect, the present invention relates to a low water peak, hydrogen resistant optical waveguide fiber, wherein the fiber comprises a silica containing glass core and a glass cladding surrounding the silica containing glass core, wherein the optical waveguide fiber exhibits an optical attenuation at a wavelength of about 1383 nm which is less than or equal to an optical attenuation exhibited at a wavelength of about 1310 nm, and wherein the optical waveguide fiber exhibits a maximum hydrogen induced attenuation change of less than about 0.03 dB/km at a wavelength of 1383 nm after being subjected to a 0.01 atm hydrogen partial pressure for at least 144 hours. Preferably, the optical attenuation exhibited at a wavelength of about 1383 nm is at least 0.04 dB/km less than the optical attenuation exhibited at a wavelength of about 1310 nm, more preferably less than or equal to about 0.35 dB/km, even more preferably less than or equal to about 0.31 dB/km.

In still another aspect, the present invention relates to a low water peak, hydrogen resistant optical waveguide fiber, the fiber comprising a silica containing glass core and a glass cladding surrounding the silica containing glass core, wherein the optical waveguide fiber exhibits an optical attenuation of less than about 0.31 dB/km at a wavelength of about 1383 nm, and wherein the optical waveguide fiber exhibits a maximum hydrogen induced attenuation change of less than about 0.03 dB/km at a wavelength of about 1383 nm after being subjected to a 0.01 atm hydrogen partial pressure for at least 144 hours. Preferably, the optical waveguide fiber exhibits a maximum hydrogen induced attenuation change of less than about 0.03 dB/km at a wavelength of about 1383 nm after being subjected to a 0.01 atm hydrogen partial pressure for at least 336 hours. Preferably, the optical waveguide fiber exhibits an optical attenuation of less than about 0.36 dB/km at each wavelength within a wavelength range from about 1300 nm to about 1600 nm. Preferably, the optical waveguide fiber exhibits an optical attenuation of less than about 0.35 dB/km at each wavelength within a wavelength range from about 1300 nm to about 1600 nm, more preferably less than about 0.34 dB/km at each wavelength within a wavelength range from about 1300 nm to about 1600 nm.

Preferably, the optical waveguide fiber exhibits a maximum hydrogen induced attenuation change of less than about 0.02 dB/km at each wavelength within a wavelength range from about 1300 nm to about 1600 nm after being subjected to a 0.01 atm hydrogen partial pressure for at least 144 hours. More preferably, the optical waveguide fiber exhibits a maximum hydrogen induced attenuation change of less than about 0.02 dB/km at each wavelength within a wavelength range from about 1300 nm to about 1600 nm after being subjected to a 0.01 atm hydrogen partial pressure for at least 336 hours. Still more preferably, the optical waveguide fiber exhibits a maximum hydrogen induced attenuation change of less than about 0.01 dB/km at each wavelength within a wavelength range from about 1300 nm to about 1600 nm after being subjected to a 0.01 atm hydrogen partial pressure for at least 144 hours.

Preferably, the optical waveguide fiber exhibits a maximum hydrogen induced attenuation change of less than about 0.01 dB/km at each wavelength within a wavelength range from about 1300 nm to about 1600 nm after being subjected to a 0.01 atm hydrogen partial pressure for at least 144 hours, and more preferably, the optical waveguide fiber exhibits a maximum hydrogen induced attenuation change of less than about 0.005 dB/km at each wavelength within a wavelength range from about 1300 nm to about 1600 nm after being subjected to a 0.01 atm hydrogen partial pressure for at least 336 hours.

Preferably, the optical waveguide fiber exhibits a maximum hydrogen induced attenuation change of less than about 0.02 dB/km at a wavelength of about 1383 nm after being subjected to a 0.01 atm hydrogen partial pressure for at least 144 hours. More preferably, the optical waveguide fiber exhibits a maximum hydrogen induced attenuation change of less than about 0.02 dB/km at a wavelength of about 1383 nm after being subjected to a 0.01 atm hydrogen partial pressure for at least 336 hours.

Preferably, the optical waveguide fiber exhibits a maximum hydrogen induced attenuation change of less than about 0.01 dB/km at a wavelength of about 1383 nm after being subjected to a 0.01 atm hydrogen partial pressure for at least 144 hours. More preferably, the optical waveguide fiber exhibits a maximum hydrogen induced attenuation change of less than about 0.01 dB/km at a wavelength of about 1383 nm after being subjected to a 0.01 atm hydrogen partial pressure for at least 336 hours.

Preferably, the optical waveguide fiber exhibits a maximum hydrogen induced attenuation change of less than about 0.005 dB/km at a wavelength of about 1383 nm after being subjected to a 0.01 atm hydrogen partial pressure for at least 144 hours. More preferably, the optical waveguide fiber exhibits a maximum hydrogen induced attenuation change of less than about 0.005 dB/km at a wavelength of about 1383 nm after being subjected to a 0.01 atm hydrogen partial pressure for at least 336 hours.

Preferably, the optical waveguide fiber exhibits a maximum hydrogen induced attenuation change of less than about 0.003 dB/km at a wavelength of about 1383 nm after being subjected to a 0.01 atm hydrogen partial pressure for at least 144 hours. More preferably, the optical waveguide fiber exhibits a maximum hydrogen induced attenuation change of less than about 0.003 dB/km at a wavelength of about 1383 nm after being subjected to a 0.01 atm hydrogen partial pressure for at least 336 hours.

Preferably, the optical waveguide fiber exhibits a maximum hydrogen induced attenuation change of less than about 0.005 dB/km at a wavelength of about 1530 nm after being subjected to a 0.01 atm hydrogen partial pressure for at least 144 hours. More preferably, the optical waveguide fiber exhibits a maximum hydrogen induced attenuation change of less than about 0.005 dB/km at a wavelength of about 1530 nm after being subjected to a 0.01 atm hydrogen partial pressure for at least 336 hours.

Preferably, the optical waveguide fiber exhibits a maximum hydrogen induced attenuation change of less than about 0.002 dB/km at a wavelength of about 1530 nm after being subjected to a 0.01 atm hydrogen partial pressure for at least 144 hours. More preferably, the optical waveguide fiber exhibits a maximum hydrogen induced attenuation change of less than about 0.002 dB/km at a wavelength of about 1530 nm after being subjected to a 0.01 atm hydrogen partial pressure for at least 336 hours.

Preferably, the optical waveguide fiber exhibits a maximum hydrogen induced attenuation change of less than about 0.001 dB/km at a wavelength of about 1530 nm after being subjected to a 0.01 atm hydrogen partial pressure for at least 144 hours. More preferably, the optical waveguide fiber exhibits a maximum hydrogen induced attenuation change of less than about 0.001 dB/km at a wavelength of about 1530 nm after being subjected to a 0.01 atm hydrogen partial pressure for at least 336 hours.

Preferably, the optical waveguide fiber exhibits a maximum hydrogen induced attenuation change of less than about 0.020 dB/km at a wavelength of about 1430 nm after being subjected to a 0.01 atm hydrogen partial pressure for at least 336 hours. More preferably, the optical waveguide fiber exhibits a maximum hydrogen induced attenuation change of less than about 0.010 dB/km at a wavelength of about 1430 nm after being subjected to a 0.01 atm hydrogen partial pressure for at least 336 hours. Even more preferably, the optical waveguide fiber exhibits a maximum hydrogen induced attenuation change of less than about 0.005 dB/km at a wavelength of about 1430 nm after being subjected to a 0.01 atm hydrogen partial pressure for at least 336 hours.

Preferably, the optical waveguide fiber exhibits an optical attenuation of less than about 0.25 dB/km at a wavelength of about 1550 nm.

Preferably, the core is doped with germania.

In a preferred embodiment, the core and the cladding each have a respective refractive index which form a step-index profile.

In a preferred embodiment, the fiber is capable of single mode operation at 1550 nm.

Preferably, the fiber has a cable cutoff wavelength of less than or equal to about 1260 nm.

In a preferred embodiment, the fiber is a step-index, single mode fiber.

Preferably, the cladding glass comprises silica.

In a preferred embodiment, the core and the cladding each have a respective refractive index which form a step-index profile.

In a preferred embodiment, the fiber contains no fluorine-based dopant.

In a preferred embodiment, the glass core contains no fluorine-based dopant.

In a preferred embodiment, the glass cladding contains no fluorine-based dopant.

One or more preferred embodiments of the fiber are formed from an OVD process.

Preferably, the silica containing core glass includes a weighted average OH content of less than 1 ppb.

In yet another aspect, the present invention relates to a low water peak, hydrogen resistant optical waveguide fiber, the fiber comprising a silica containing glass core and a glass cladding surrounding the silica containing glass core, wherein the optical waveguide fiber exhibits an optical attenuation of less than about 0.36 dB/km at each wavelength within a wavelength range from about 1300 nm to about 1600 nm after being subjected to a 0.01 atm hydrogen partial pressure for at least 144 hours.

Preferably, the optical waveguide fiber exhibits an optical attenuation of less than about 0.36 dB/km at each wavelength within a wavelength range from about 1300 nm to about 1600 nm after being subjected to a 0.01 atm hydrogen partial pressure for at least 336 hours.

Preferably, the optical waveguide fiber exhibits an optical attenuation of less than about 0.35 dB/km at each wavelength within a wavelength range from about 1300 nm to about 1600 nm after being subjected to a 0.01 atm hydrogen partial pressure for at least 144 hours. More preferably, the optical waveguide fiber exhibits an optical attenuation of less than about 0.35 dB/km at each wavelength within a wavelength range from about 1300 nm to about 1600 nm after being subjected to a 0.01 atm hydrogen partial pressure for at least 336 hours.

Preferably, the optical waveguide fiber exhibits an optical attenuation of less than about 0.34 dB/km at each wavelength within a wavelength range from about 1300 nm to about 1600 nm after being subjected to a 0.01 atm hydrogen partial pressure for at least 144 hours. More preferably, the optical waveguide fiber exhibits an optical attenuation of less than about 0.34 dB/km at each wavelength within a wavelength range from about 1300 nm to about 1600 nm after being subjected to a 0.01 atm hydrogen partial pressure for at least 336 hours.

In another aspect, the present invention relates to a preform for use in manufacturing optical waveguide fiber, the preform comprising a silica body having a through-hole with two open ends and at least one deuterated glass body disposed at least partially in the silica body, the deuterated body having at least a portion thereof exposed to the hole, wherein the preform is capable of being subsequently drawn into an optical waveguide fiber, and wherein the deuterated body does not form part of the optical waveguide fiber. The at least one deuterated glass body may be an expendable glass body which does not form part of the material suitable for drawing into optical fiber.

In a preferred embodiment, the deuterated body comprises a plug. In another preferred embodiment, the deuterated body comprises a tip plug. In yet another preferred embodiment, the deuterated body comprises a membrane ballast plug. In still another preferred embodiment, the deuterated body comprises a handle.

The silica body may include a silica soot body, and at least part of the silica soot body is deposited on at least part of the handle. In a preferred embodiment, the deuterated body is fixed to the silica body. In one preferred embodiment, the deuterated body at least partially seals at least one end of the hole. In another preferred embodiment, the deuterated body seals one end of the hole. The deuterated body may preferably directly contact the silica body.

In one preferred embodiment, the at least one deuterated body comprises first and second deuterated bodies. The first deuterated body may preferably be interposed between the silica body and the second deuterated body. At least one of the first and second deuterated bodies may preferably seal one end of the hole. In a preferred embodiment, the first deuterated body is fixed to the silica body.

The silica body may further comprise at least one undeuterated body disposed on the silica body, the undeuterated body having at least a portion thereof exposed to the hole. The undeuterated body may comprise a plug, and/or the undeuterated body comprises a handle. The undeuterated body may at least partially seal at least one end of the hole. An undeuterated body may seal one end of the hole. The undeuterated body may directly contacts the silica body. The undeuterated body may be interposed between the silica body and the at least one deuterated body.

As mentioned above, the silica body may include a silica soot body. The silica soot body preferably comprises at least one dopant. In a preferred embodiment, the silica soot body is capable of being drawn into a step-index fiber. In one preferred embodiment, the silica soot body comprises germania.

In a preferred embodiment, the silica soot body is not fluorine-doped.

In another preferred embodiment, the silica soot body is not phosphorus-doped.

In one embodiment, at least part of the silica soot body is deposited on at least part of the at least one deuterated body.

In one preferred embodiment, the silica body is deuterated.

The silica body may comprise a sintered glass preform. In a preferred embodiment, the sintered glass preform is fused with the deuterated body.

In one preferred embodiment, both ends of the hole are sealed.

In a preferred embodiment, the pressure inside the hole is lower than the ambient pressure surrounding the preform. Preferably, at least one end of the hole may be sealed with the at least one deuterated body. More preferably, each end of the hole may be sealed with a respective deuterated body.

The sintered glass preform may further comprise at least one undeuterated body disposed on the silica body, the undeuterated body having at least a portion thereof exposed to the hole. The sintered glass preform may be fused with the undeuterated body.

In a preferred embodiment, the sintered glass preform is fused with the deuterated body.

In yet another aspect, the present invention relates to a method of fabricating a preform for use in manufacturing optical waveguide fiber, the method comprising the steps of: depositing soot onto a substrate to form a soot body thereon; removing the substrate from the soot body, thereby forming a centerline hole extending axially through the soot body; inserting plugs into each end of the centerline hole, wherein at least one of the plugs is pre-deuterated; drying the soot body; and consolidating the soot body to form a glass preform having a sealed centerline hole.

In still another aspect, the present invention relates to a method of fabricating a preform for use in manufacturing optical waveguide fiber, the method comprising the steps of: depositing soot onto a substrate and a first glass body to form a soot body thereon; removing the substrate from the soot body, thereby forming a centerline hole extending axially therethrough; inserting at least one other glass body into one end of the centerline hole; drying the soot body; and consolidating the soot body to form a glass preform, wherein a portion of the soot body sinters around and engages the at least one other glass body, and wherein at least one of the glass bodies is pre-deuterated.

In another aspect, the present invention relates to a method of fabricating a preform for use in manufacturing optical waveguide fiber, the method comprising the steps of: depositing soot onto a substrate and a first glass body to form a soot body thereon; removing the substrate from the soot body, thereby forming a centerline hole extending axially therethrough; inserting second and third glass bodies into respective ends of the centerline hole; drying the soot body; and consolidating the soot body to form a glass preform, wherein a portion of the soot body sinters around and engages the second and third glass bodies, thereby sealing the centerline hole;

At least one of the glass bodies is preferably deuterated.

In still another aspect, the present invention relates to a method of fabricating a preform for use in manufacturing optical waveguide fiber, the method comprising the steps of: depositing at least one layer of soot in a tube; sintering the soot within the tube to form a sintered preform having a centerline hole; and inserting at least one deuterated glass body into the sintered preform and in communication with the centerline hole.

In yet another aspect, the present invention relates to a method of fabricating a preform for use in manufacturing optical waveguide fiber, the method comprising the steps of: depositing glass inside a tube form a sintered preform having a centerline hole and inserting at least one deuterated glass body into the sintered preform and in communication with the centerline hole.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
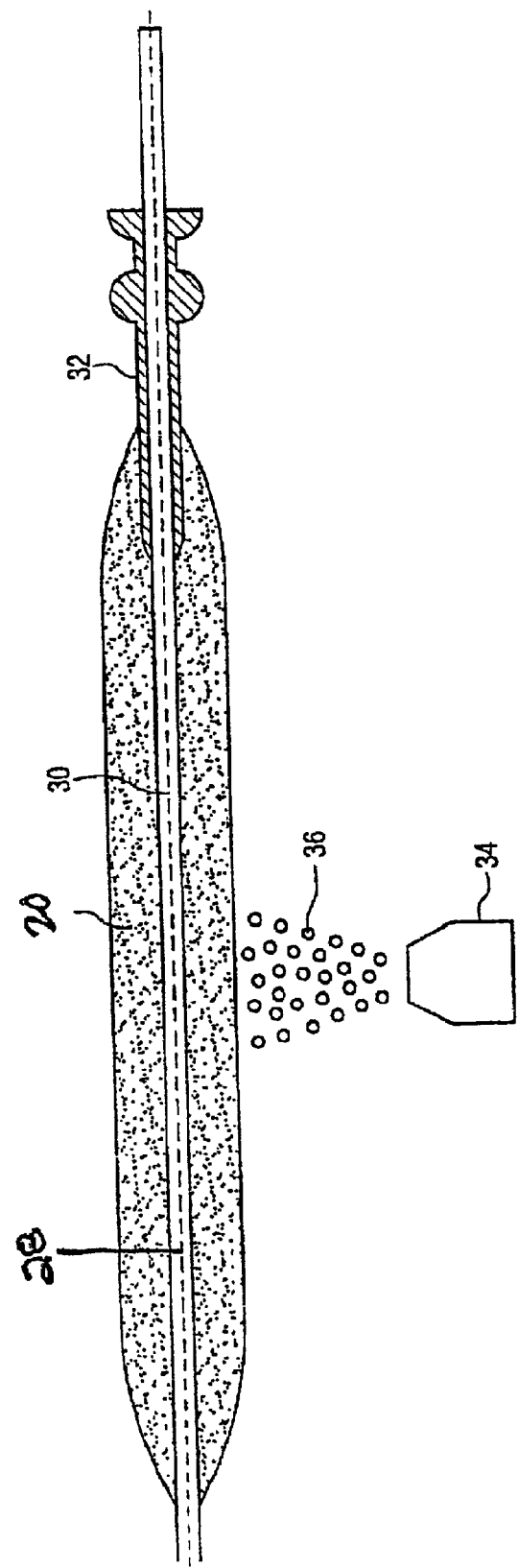
FIG. 1 schematically illustrates the manufacture of a porous body using an outside vapor deposition process in accordance with the present invention.

Reference will now be made in detail to the present preferred embodiments of the invention, examples of which are illustrated in the accompanying drawings. Whenever possible, the same reference numerals will be used throughout the drawings to refer to the same or like parts.

The following applications are incorporated herein by reference: U.S. patent application Ser. No. 547,598, filed on Apr. 11, 2000, entitled "Low Water Peak Optical Waveguide and Method of Making Same", and U.S. Provisional Patent Application No. 60/131,033, filed Apr. 26, 1999, and U.S. Provisional Patent Application No. 60/185,253 filed Feb. 28, 2000, and U.S. Provisional Patent Application No. 60/258, 179 filed Dec. 22, 2000.

In accordance with the invention, soot preform or soot body 20, as exemparily illustrated in FIG. 1, is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which includes hydrogen bonded to oxygen. The soot body may be formed, for example, by depositing layers of soot onto a bait rod via an OVD process. Such an OVD process is illustrated in FIG. 1.

As shown in FIG. 1 a substrate or bait rod or mandrel 30 is inserted through a glass body such as hollow or tubular handle 32 and mounted on a lathe (not shown). The lathe is designed to rotate and translate mandrel 30 in close proximity with a soot-generating burner 34. As mandrel 30 is rotated and translated, silica-based reaction product 36, known generally as soot, is directed toward mandrel 30. At least a portion of silica-based reaction product 36 is deposited on mandrel 30 and on a portion of handle 32 to form a body 20 thereon. While this aspect of the present invention has been described in conjunction with a mandrel 30 that is traversed by a lathe, it will be understood by those skilled in the art that soot generating burner 34 can traverse rather than mandrel 30. Moreover, this aspect of the present invention is not intended to limit soot deposition to an OVD process. Rather, other methods of chemically reacting at least some of the constituents of a moving fluid mixture, such as, but not limited to, liquid delivery of at least one glass-forming precursor compound in an oxidizing medium can be used to form the silica-based reaction product of the present invention, as disclosed, for example, in U.S. Provisional Patent Application Ser. No. 60/095,736, filed on Aug. 7, 1997, and PCT Application Ser. No. PCT/US98/25608, filed on Dec. 3, 1998, the contents of which are hereby incorporated by reference. Moreover, other processes, such as the inside vapor (IV) deposition process, and modified chemical vapor deposition (MCVD) process are also applicable to the present invention.

Once the desired quantity of soot has been deposited on mandrel 30, soot deposition is terminated and mandrel 30 is removed from soot body 38.

In accordance with the present invention and as depicted in FIG. 1 upon removal of mandrel 30, soot body 38 defines a centerline hole 40 passing axially therethrough. Preferably, soot body 38 is suspended by handle 32 on a downfeed handle 42 and positioned within a consolidation furnace 44. The end of centerline hole 40 remote from handle 32 is preferably fitted with a bottom plug 46 prior to positioning soot body 38 within consolidation furnace 44. Preferably, bottom plug 46 is positioned and held in place with respect to soot body 38 by friction fit. Plug 46 is further preferably tapered to facilitate entry and to allow at least temporary affixing, and at least loosely, within the soot body 38.

Soot body 38 is preferably chemically dried, for example, by exposing soot body 38 to a chlorine containing atmosphere at elevated temperature within consolidation furnace 44. Chlorine containing atmosphere 48 effectively removes water and other impurities from soot body 38, which otherwise would have an undesirable effect on the properties of optical waveguide fiber manufactured from soot body 38. In an OVD formed soot body 38, the chlorine flows sufficiently through the soot to effectively dry the entire blank, including the region surrounding centerline hole 40.

Following the chemical drying step, the temperature of the furnace is elevated to a temperature sufficient to consolidate the soot blank into a sintered glass preform, preferably about 1500° C. The centerline hole 40 is closed during the consolidation step. In a preferred embodiment, centerline region 24 has a weighted average OH content of less than about 1 ppb.

In the past, the soot body 38 was typically chemically dried and consolidated, and following chemical drying and consolidation, the resulting sintered glass preform was routinely exposed to a water containing environment, such as ambient atmosphere, for example, when the sintered glass preform was removed from the consolidation furnace and moved to a redraw furnace for further processing steps. Invariably, optical waveguide fibers manufactured using such preforms exhibited excessively high levels of optical attenuation in the 1380 nm window (also referred to as the 1380–1390 nm window). It has since been found that this high attenuation, known generally as the "water peak", is largely due to absorption of water by that portion of the sintered glass preform surrounding the centerline hole prior to centerline hole closure. It is now recognized that physisorbed water ($OH_2$) and chemisorbed water (Beta OH) in the glass bounding the centerline hole results substantially instantaneously when the glass is exposed to an atmosphere containing a hydrogen compound such as, but not limited to water ($H_2O$). Moreover, the greater the exposure time, the greater the amount of water absorbed by the glass. Thus, any exposure to ambient atmosphere, or any atmosphere containing a hydrogen compound, no matter how short the period of time, will rewet that portion of the glass preform bounding the centerline hole. Such rewetting provides the impurities that cause the water peak exhibited by optical waveguide fibers manufactured using standard fiber manufacture processing techniques from blanks, such as those formed by an OVD process.

In accordance with this embodiment, the centerline hole does not have an opportunity to be rewet prior to centerline hole closure.

In a preferred embodiment of the method of the present invention, exposure of the centerline hole to an atmosphere containing a hydrogen compound is significantly reduced or prevented by closing the centerline hole during consolidation.

Figure 2:
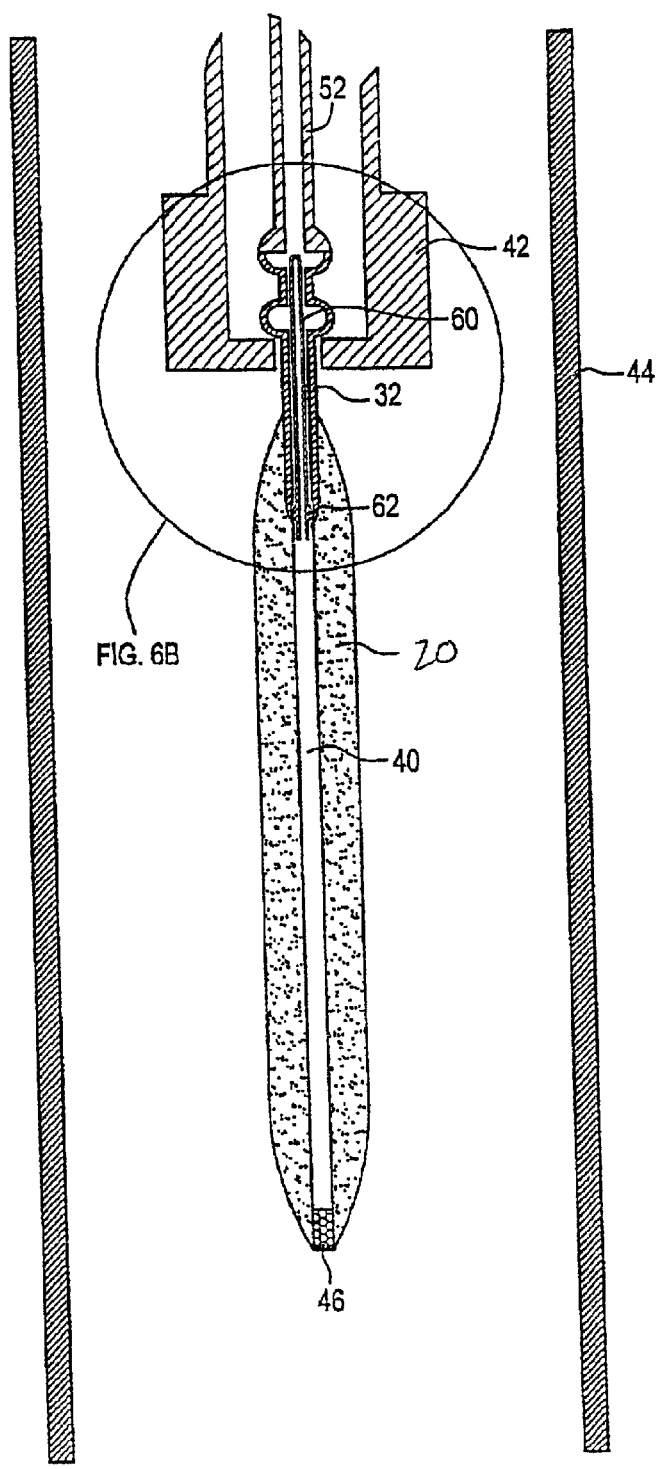
FIG. 2 is a cross-sectional view of the porous body of FIG. 2 shown fitted with top plug and suspended within a consolidation furnace in accordance with the first preferred embodiment of the present invention.
Figure 3:
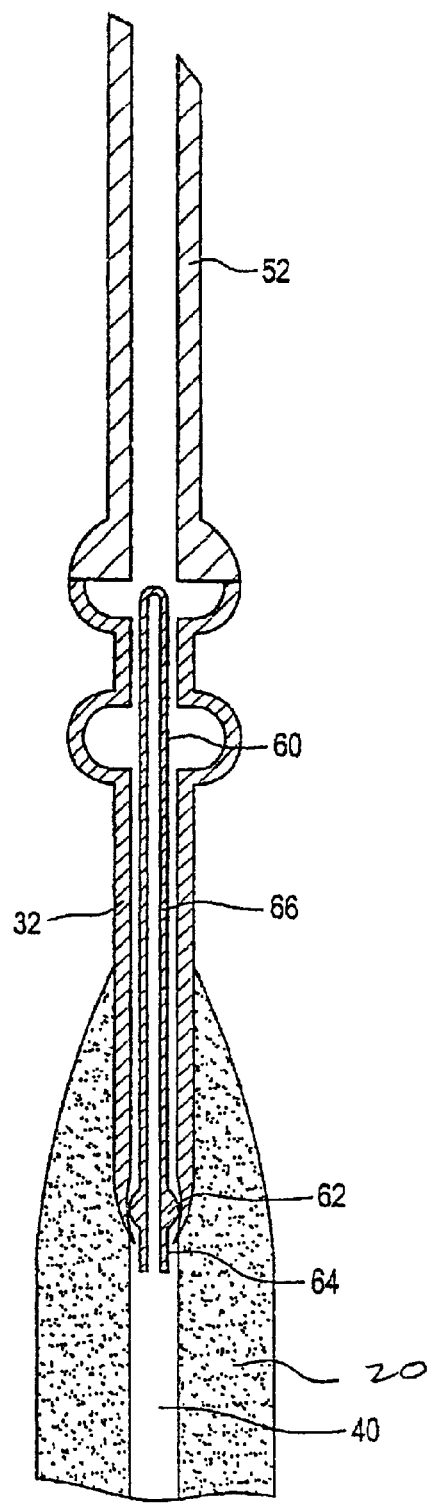
FIG. 3 is an enlarged cross-sectional view of the top plug shown positioned within the handle as depicted in FIG. 2.

Preferably, a glass body such as bottom plug 46 is positioned in centerline hole 40 at the end of soot body 38 remote from handle 32, and a glass body such as hollow tubular glass plug or top plug 60 having a open end 64 is positioned in centerline hole 40 in soot body 38 opposite plug 46 as shown in FIG. 2. Top plug 60 is shown disposed within the cavity of tubular handle 32. Following chlorine drying, soot body 38 is down driven into the hot zone of consolidation furnace 44 to seal centerline hole 40 and consolidate soot body 38 into a sintered glass preform. Drying and consolidation may optionally occur simultaneously. During consolidation, soot body 38 contracts somewhat and engages bottom plug 46 and the lower end of top plug 60, thereby fusing the resulting sintered glass preform to plug 46 and plug 60 and sealing the centerline hole 40. Sealing of both the top and bottom of centerline hole 40 can be accomplished with one pass of soot body 38 through the hot zone. Preferably, sintered glass preform is held at an elevated temperature, preferably in a holding oven, to allow inert gas to diffuse from centerline hole 40 to form a passive vacuum within sealed centerline hole 40. Preferably, top plug 60 has a relatively thin wall through which diffusion of the inert gas can more expediently occur. As depicted in FIG. 3 top plug 60 preferably has an enlarged portion 62 for supporting plug 60 within handle 32, and a narrow portion 64 extending into centerline hole 40 of soot body 38. Plug 60 also preferably includes an elongated hollow portion 66 which may preferably occupy a substantial portion of handle 32. Hollow portion 66 provides additional volume to centerline hole 40 thereby providing a better vacuum within centerline hole 40 following diffusion of the inert gas.

The volume provided by elongated portion 66 of plug 60 provides added volume to sealed centerline hole 40, advantages of which will be described in greater detail below.

As described above and elsewhere herein, bottom plug 46 and top plug 60 are preferably glass bodies having a water content of less than about 30 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion.

Furthermore, we have surprisingly found that, even after having sealed the centerline hole at both ends, the centerline hole region of the sintered glass preform was being rewet by hydroxyl ions migrating or emanating from the glassware which is in contact with the centerline hole, the glassware being other than the silica material which is further formed into optical waveguide fiber. Thus, for example, hydroxyl ions in the glass body such as the top plug 60 were surprisingly found to migrate to, and to contaminate or rewet, the centerline hole region of the sintered glass preform 38. Moreover, we have found that by substantially replacing the OH ions in glass bodies such as plug 60 before inserting same into, onto, or near the soot body 38, i.e. by pre-deuterating the glass body, rewetting of the centerline hole region could be even further prevented.

Thus, optical waveguide fiber which has been subsequently drawn from a preform formed in the above manner exhibits lower optical attenuation compared to fiber drawn from preforms which had no deuterated glass bodies in contact with and/or sealing the centerline hole. In particular, ultra low optical attenuation at 1383 nm can be achieved by preferably utilizing at least one deuterated glass body in the manner described above. Consequently, overall lower O—H overtone optical attenuation can be achieved. For example, the water peak at 1383 nm, as well as at other OH induced water peaks, such as at 950 nm or 1240 nm, can be lowered according to the present invention, and even virtually eliminated.

Even more preferably, all glass bodies which are to be placed in contact with the centerline hole before disposing same in, on, or near a soot body or silica-based reaction product or sintered glass preform are pre-deuterized.

It should be noted that providing one or more deuterated bodies for disposing in, on or proximate a soot body or sintered glass preform or reaction product(s) in order to obtain the beneficial results discussed above is not limited to an OVD process, and furthermore is not limited to a particular means of sealing the centerline hole, passively or actively inducing a vacuum in the centerline hole, or otherwise closing the centerline hole. For example, additional methods for closing the centerline hole are disclosed in U.S. Provisional Patent Application No. 60/131,012, filed Apr. 26, 1999, titled "Optical Fiber Having Substantially Circular Core Symmetry and Method of Manufacturing Same", and in U.S. patent application Ser. No. 547,598, filed on Apr. 11, 2000, entitled "Low Water Peak Optical Waveguide and Method of Making Same", and U.S. Provisional Patent Application No. 60/131,033, filed Apr. 26, 1999, the contents of which are hereby incorporated by reference.

In one preferred embodiment, plug 60 was exposed to 5% deuterium in a helium atmosphere at 1 atm at about 1000°

C. for about 24 hours. In another preferred embodiment, plug 60 was exposed to 3% deuterium in a nitrogen atmosphere at 1 atm at about 1000° C. for about 24 hours.

Following the above-described steps, the sintered glass preforms can be removed from consolidation furnace 44 and thereafter stored for further processing at a later time, preferably within a holding oven, or positioned within a redraw furnace where the glass preforms can be drawn into a reduced diameter cylindrical glass body such as a core cane, if desired. Because the sintered glass preform has a sealed centerline hole, the centerline region and the centerline hole are not accessible to ambient atmosphere, or any other environment that includes a hydrogen containing compound. Accordingly, the centerline region and centerline holes of the respective sintered glass preforms will remain dry during storage and/or en route to the redraw furnace.

At redraw, the sintered glass preforms formed as described above are suspended within a furnace 68 by downfeed handles 42. The temperature within furnace 68 is elevated to a temperature which is sufficient to stretch the glass preforms, preferably about 1950° C. to about 2100° C., and thereby reduce the diameters of the preforms to form a cylindrical glass body such as a core cane. Sintered glass preform 78, corresponding to soot body 38, is heated and stretched to form a reduced core cane 74 having a centerline region 76. Centerline hole 40 closes to form centerline region 76 during the redraw process. The reduced pressure maintained within sealed centerline hole 40 created passively during consolidation, is generally sufficient to facilitate complete centerline hole 40 closure during redraw.

The reduced diameter core cane, a portion of which preferably constitutes cladding, produced by any of the above-described embodiments can be overclad, such as by further soot deposition, for example by an OVD process or with a rod-in-tube arrangement, and subsequently drawn into an optical waveguide fiber having a central core portion bounded by a cladding glass.

Figure 4:
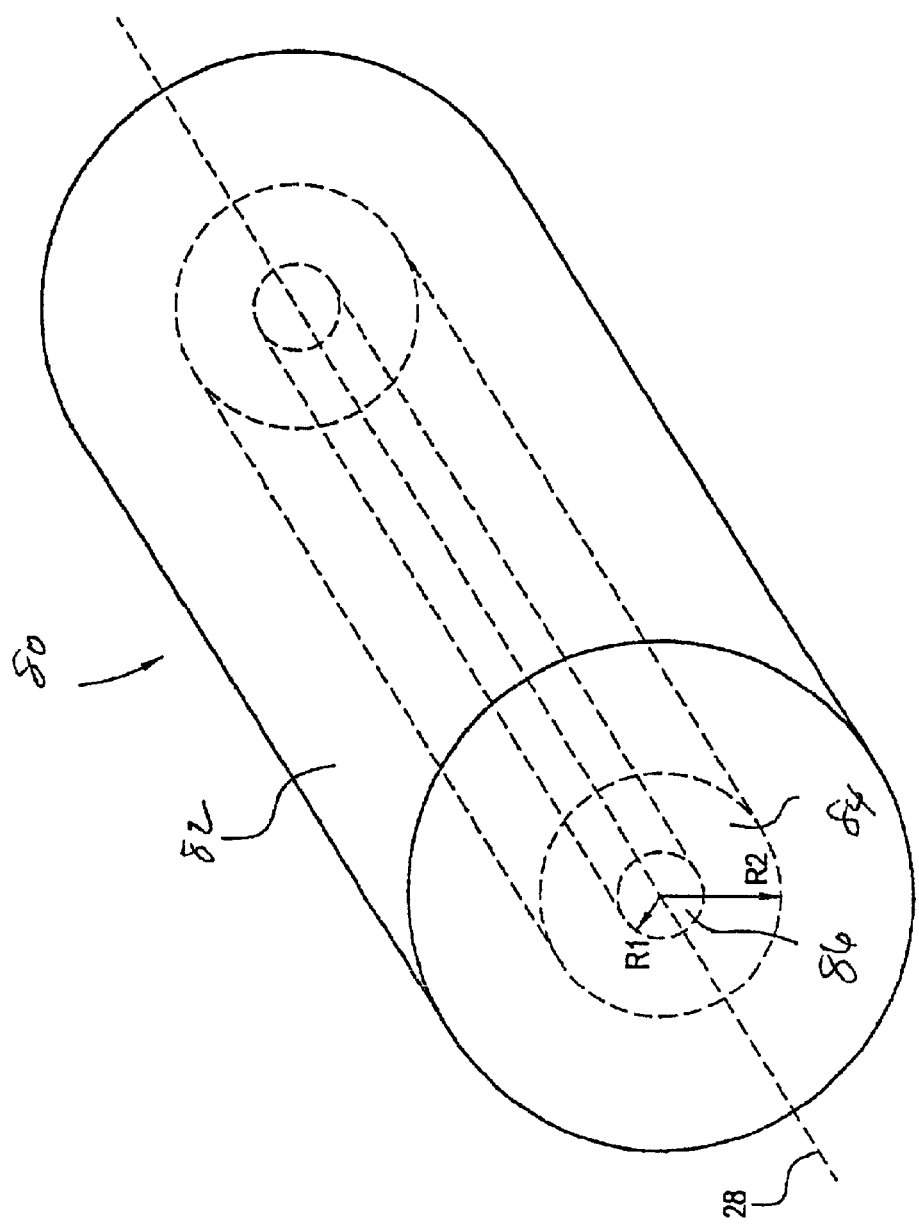
FIG. 4 is a perspective view of a cylindrical glass body shown depicting the centerline region R2 in accordance with the present invention.

As shown FIG. 4 and in accordance with the invention, cylindrical optical fiber body 80 includes a silica containing glass region 82, at least a portion of which includes hydrogen bonded to oxygen. Silica containing glass region 82 includes a centerline region 84 having a weighted average OH content of less than about 2 ppb, and preferably less than about 1 ppb. Centerline region 84 bounds a smaller diameter dopant (preferably germania) containing region 86 (depicted by radial distance Rj), and both centerline region 84 and dopant containing region 86 extend longitudinally along central axis 28 of cylindrical optical fiber body 80.

Centerline region 84, represented by radial distance R2 as depicted in FIG. 4 is defined as that portion of optical fiber body 80 wherein about 99% of the propagated light travels. Stated differently, when the attenuation spectra of an optical waveguide fiber manufactured from optical fiber body 80 can be measured on a Photon Kinetics attenuation measurement bench (PK bench) at a wavelength of 1380 nm. In preferred embodiments, the centerline region comprises segments or annular regions. Preferably, two or more segments have positive refractive indexes or positive relative refractive indexes.

The optical fiber body 80 represents either a glassy preform which serves as a precursor to an optical waveguide fiber, or the fiber itself, as the relative dimensions of the regions at a given cross-section are preserved after drawing the optical fiber preform into a fiber.

In at least one preferred embodiment, the centerline region 24 contains no fluorine dopant. In another preferred embodiment, the dopant containing region 26 contains no fluorine dopant. In yet another preferred embodiment, the region surrounding centerline region 24 contains no fluorine dopant. In still another preferred embodiment, the cylindrical glass body 20 contains no fluorine dopant.

In at least one preferred embodiment, the cylindrical glass body 20 contains no phosporus.

In another preferred embodiment, the cylindrical glass body 20 comprises a substantially pure silica centerline region and a fluorine doped region surrounding the centerline region.

In a preferred embodiment, the core and cladding form neither a step-index profile nor a graded index profile.

The drawn optical waveguide fiber is then preferably deuterized. Deuteration can be carried out by a number of various processes, and may be achieved by maintaining a silica body or part thereof at an elevated temperature in an atmosphere comprising deuterium. Appropriate heat treating times and temperatures can be determined from data available in the literature. DO/OH exchange in silica may occur at temperatures as low as 150° C., although treatment is more preferably carried out at higher temperatures, typically above about 500° C. The atmosphere can be either substantially D2 or may also comprise inert diluents, e.g., $N_2$ or Ar. The time required for substantially complete deuterium/hydrogen (D/H) exchange throughout a volume of silica depends substantially exponentially on the temperature, at least approximately on the square of the diffusion distance, and approximately proportionally to the OH-concentration initially present in the silica body. The skilled artisan can estimate required heat treating times from data available in the literature. The required time also depends to some degree on the concentration of deuterium in contact with the silica body. Typically, a deuterium partial pressure of at least about 10 Torr can produce effective infusion of deuterium at appropriate temperatures.

Thus, for a given D2 concentration, treatment times and temperatures could also be varied with equivalently effective results, independent of the carrier gas type. D2 concentration could be also be varied with correspondingly varied time and temp and yield equivalently effective results.

Preferably, the resulting fiber exhibits a maximum hydrogen induced attenuation change of less than about 0.03 dB/km at a wavelength of 1383 nm after being subjected to a 0.01 atm hydrogen partial pressure for at least 144 hours. Even more preferably, the resulting fiber exhibits an optical attenuation at a wavelength of about 1383 nm which is at least 0.04 dB/km less than the optical attenuation exhibited at a wavelength of about 1310 nm. Even more preferably, the optical attenuation exhibited at a wavelength of about 1383 nm is less than or equal to about 0.35 dB/km. Still more preferably, the optical attenuation exhibited at a wavelength of about 1383 nm is less than or equal to about 0.31 dB/km.

Figure 5:
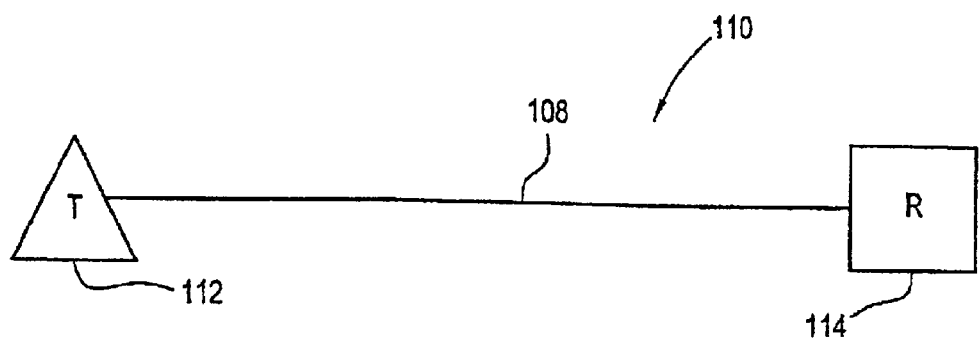
FIG. 5 is an optical fiber communication system in accordance with the present invention.

As shown in FIG. 5 and in accordance with another embodiment of the present invention, an optical fiber 108 manufactured in accordance with the present invention can form part of an optical fiber communication system 110.

Optical fiber communication system 110 generally includes a transmitter 112, a receiver 114, and optical waveguide fiber 108 for communicating an optical signal between transmitter 112 and receiver 114.

In one preferred embodiment, within optical fiber communication system 110, optical waveguide fiber 108 exhibits an optical attenuation at a wavelength of about 1383 nm which is less than or equal to an optical attenuation exhibited at a wavelength of about 1310 nm, and the optical waveguide fiber exhibits a maximum hydrogen induced attenuation change of less than about 0.03 dB/km at a wavelength of 1383 nm after being subjected to a 0.01 atm hydrogen partial pressure for at least 144 hours. Even more preferably, the resulting fiber exhibits an optical attenuation at a wavelength of about 1383 nm which is at least 0.04 dB/km less than the optical attenuation exhibited at a wavelength of about 1310 nm. Even more preferably, the optical attenuation exhibited at a wavelength of about 1383 nm is less than or equal to about 0.35 dB/km. Still more preferably, the optical attenuation exhibited at a wavelength of about 1383 nm is less than or equal to about 0.31 dB/km.

EXAMPLES

The invention will be further clarified by the following examples, which are intended to be exemplary of the invention.

Example 1

A membrane ballast plug or hollow tubular glass plug was exposed to about 3% D2 and balance nitrogen gas environment at a temperature of 1000° C. for about 24 hours. Germania doped soot was deposited onto a mandrel and a handle. The mandrel was removed, yielding a soot preform with a centerline hole with the handle jutting out one end. A tapered bottom tip plug was inserted into one end of soot preform opposite the handle with a friction fit. The previously deuterated membrane ballast plug was inserted into the other end of soot preform so that the membrane ballast plug rested in the handle at this point. The soot preform was dried with about 4% $Cl_2$ (chlorine) and the balance helium gas at a temperature of 1125° C. for about 4 hours. The soot preform was then consolidated at a temperature of about 1500° C. in a helium gas environment. As the preform consolidated, the sintered glass pulled into engagement with the tip plug and the membrane ballast plug, thereby sealing the centerline hole, yielding a sintered glass preform with a sealed centerline hole. The sintered glass preform was then held at a temperature of about 900° C. in an argon gas environment for about 10 hours, whereby a relative vacuum was passively induced in the centerline hole. Thereafter, glass preform was heated to a temperature of about 1800° C. for 2 hours in an argon gas environment and drawn or stretched in a so-called redraw step, thereby causing the centerline hole to close or collapse upon itself, yielding a reduced diameter glass body (such as a core cane) without a centerline hole. Cladding soot was then deposited by an OVD process onto the core cane, yielding an overclad cane. The overclad cane was then dried with 1% $Cl_2$ (chlorine) in helium gas at a temperature of about 1265 to 1350° C. The dried overclad cane was then consolidated at a temperature of about 1495° C. in a helium gas environment, yielding a sintered glass preform (optical fiber preform). The optical fiber preform was then heated at a temperature of about 1950° C. in a helium gas environment and drawn or stretched, thereby reducing the diameter, yielding an optical fiber or optical waveguide fiber. The fiber was then exposed to a 3% D2 and balance $N_2$ and $O_2$ mixture at a temperature of about 34° C. for about 60 hours. Attenuation in accordance with the IEC 60793-2 test procedure for the resulting fiber was as follows: less than or equal to 0.35 dB/km @ 1310 nm; less than or equal to 0.31 dB/km @ 1383 nm; less than or equal to 0.25 dB/km @ 1550 nm; and attenuation increases due to hydrogen aging @ 1383 nm of less than or equal to 0.01 dB/km.

The present inventions allows a more effective approach to optimize the performance of a positively chirped laser with a waveguide fiber having a negative total dispersion. A positively chirped pulse propagating in a negative total dispersion fiber undergoes compression and hence a negative dispersion power penalty is obtained. One embodiment of the present invention provides a fiber having negative dispersion at the desired operating wavelength, together with a positively chirped laser, so that very long link lengths can be achieved before a repeater or regeneration is needed. For example, a positively chirped laer may be used with an optical fiber at an operating wavelength around 1380 nm wherein the fiber has a zero dispersion wavelength greater than about 1380 nm and a negative dispersion around 1380 nm.

Preferably, the method of the present invention reduces the amount of water trapped within, and the amount of water which reenters, the centerline region of a silica body such as a soot preform, a glassy preform, and/or an optical waveguide fiber.

Preferably, an optical waveguide fiber manufactured in accordance with the method described herein and/or made from a preform described herein, operates at any selected wavelength over a range of wavelengths from about 1300 nm to about 1680 nm without undue optical attenuation, even when subjected to hydrogen environments.

One or more preferred embodiments of the present invention may have characteristics such as the fibers be found in U.S. Provisional Patent Application No. 60/075754 filed Feb. 23, 1998 and patent application Ser. No. 09/239,509 filed Jan. 28, 1999, and U.S. Provisional Patent Application No. 60/156735 filed Sep. 30, 1999 and U.S. patent application Ser. No. 09/645025 filed Aug. 23, 2000, and U.S. Provisional Patent Application No. 60/185,253 filed Feb. 28, 2000, all of which are incorporated by reference herein.

What is claimed is:

1. A method of fabricating a preform for use in manufacturing optical waveguide fiber, the method comprising the steps of:

depositing soot onto a substrate to form a soot body thereon, the soot body having opposing first and second ends;

removing the substrate from the soot body, thereby forming a centerline hole extending axially through the soot body from the first end to the second end of the soot body, the centerline hole having two opposing ends disposed at the first and second ends of the soot body, respectively;

inserting a first glass body into the centerline hole at the first end of the soot body, the first glass body comprising deuterated glass, and inserting a second glass body into the centerline hole at the second end of the soot body;

drying the soot body; and consolidating the soot body to form a glass preform.

2. The method of claim 1 wherein a portion of the soot body sinters around and engages the first glass body during the consolidating step.

3. The method of claim 1 wherein the opposing ends of the centerline hole are closed during the consolidating step, wherein the glass preform has a sealed centerline hole.

4. The method of claim 1 wherein the second glass body comprises deuterated glass.

5. The method of claim 1 wherein the first glass body is deuterated before the depositing step.

6. The method of claim 1 wherein, prior to the depositing step, the substrate is inserted into a tubular glass body, and during the depositing step, depositing additional soot on the tubular glass body.

7. The method of claim 6 wherein the tubular glass body comprises deuterated glass.

8. The method of claim 6 wherein the tubular glass body is deuterated prior to the depositing step.

9. The method of claim 1 further comprising overcladding the glass preform.

10. The method of clam 9 wherein the overcladding step further comprises depositing soot onto the glass preform.

11. The method of claim 10 further comprising drying and consolidating the soot deposited on the glass preform.

12. The method of claim 9 wherein the overcladding step further comprises disposing a tube over the glass preform.

13. A method of forming optical fiber comprising drawing the glass preform of claim 1 into the optical fiber and deuterating the optical fiber.

14. The method of claim 1 wherein the second glass body is not deuterated prior to insertion into the centerline hole.

15. The method of claim 1 wherein the second glass body is deuterated prior to insertion into the centerline hole.

16. A method of fabricating a preform for use in manufacturing optical waveguide fiber, the method comprising the steps of:

depositing soot onto a substrate and onto a tubular glass body to form a soot body thereon, the soot body having opposing first and second ends;

removing the substrate from the soot body, thereby forming a centerline hole extending axially through the soot body from the first end to the second end of the soot body, the centerline hole having two opposing ends disposed at the first and second ends of the soot body, respectively;

inserting a first glass body into the centerline hole at the first end of the soot body and inserting a second glass body into the centerline hole at the second end of the soot body;

drying the soot body; and consolidating the soot body to form a glass preform;

wherein at least one member of the group consisting of the tubular glass body, the first glass body, and the second glass body comprises deuterated glass.

17. The method of claim 16 wherein the tubular glass body is deuterated prior to the depositing step, and/or the first glass body is deuterated prior to insertion into the centerline hole, and/or the second glass body is deuterated prior to insertion into the centerline hole.

18. The method of claim 16 wherein the tubular glass body is disposed at the first end of the soot body.

19. The method of claim 18 wherein at least a portion of the first glass body is disposed within the tubular glass body after inserting the first glass body into the soot body.

20. The method of claim 16 wherein the tubular glass body is disposed at the second end of the soot body.

21. The method of claim 20 wherein at least a portion of the second glass body is disposed within the tubular glass body after inserting the second glass body into the soot body.

* * * * *